US007881866B2

(12) United States Patent
Meunier et al.

(10) Patent No.: US 7,881,866 B2
(45) Date of Patent: Feb. 1, 2011

(54) AIRBORNE SYSTEM FOR PREVENTING COLLISIONS OF AN AIRCRAFT WITH THE TERRAIN

(75) Inventors: Hugues Meunier, Frouzins (FR); Denis Ricaud, Tournefeuille (FR)

(73) Assignee: Thales (FR)

( * ) Notice: Subject to any disclaimer, the term of this patent is extended or adjusted under 35 U.S.C. 154(b) by 1078 days.

(21) Appl. No.: 11/612,649

(22) Filed: Dec. 19, 2006

(65) Prior Publication Data

US 2007/0265776 A1 Nov. 15, 2007

(30) Foreign Application Priority Data

Dec. 20, 2005 (FR) .................................. 05 12957

(51) Int. Cl.
*G01C 23/00* (2006.01)
*G06F 17/00* (2006.01)

(52) U.S. Cl. .......................... 701/301; 701/3; 340/436; 340/945; 340/961; 340/940; 340/979

(58) Field of Classification Search ................. 701/301, 701/3, 207, 208, 209, 210; 340/436, 945, 340/961, 940, 979

See application file for complete search history.

(56) References Cited

U.S. PATENT DOCUMENTS 5,414,631 A 5/1995 Denoize et al.
5,488,563 A 1/1996 Chazelle et al.
5,594,414 A * 1/1997 Namngani .................. 340/436
5,608,392 A * 3/1997 Faivre et al. ................ 340/967
5,638,282 A 6/1997 Chazelle et al.
5,677,842 A 10/1997 Denoize et al.
5,884,223 A * 3/1999 Tognazzini ................. 701/301
6,088,654 A * 7/2000 Lepere et al. ............... 701/301
6,138,060 A * 10/2000 Conner et al. .................. 701/9
6,317,663 B1 * 11/2001 Meunier et al. ............... 701/16
6,480,120 B1 * 11/2002 Meunier ..................... 340/970
6,804,607 B1 * 10/2004 Wood ......................... 701/301
6,906,641 B2 * 6/2005 Ishihara ...................... 340/946
7,064,680 B2 * 6/2006 Reynolds et al. ............ 340/961
7,120,540 B2 * 10/2006 Meunier ..................... 701/301
7,248,219 B2 * 7/2007 Smith et al. ................. 342/456
7,271,740 B2 * 9/2007 Fischer ....................... 340/945
7,321,813 B2 * 1/2008 Meunier ....................... 701/10

(Continued)

FOREIGN PATENT DOCUMENTS

EP 0 802 469 A 10/1997

(Continued)

Primary Examiner—Thomas G Black
Assistant Examiner—Wae Louie
(74) *Attorney, Agent, or Firm*—Lowe Hauptman Ham & Berner, LLP

(57) ABSTRACT

This Terrain Awareness and Warning System produces a new "Too Low Terrain" predictive alert of "Caution" type when the crew of the aircraft has the possibility of resolving a detected risk of collision with the terrain without interrupting the current maneuver to stabilize at a safety altitude by a leveling-off maneuver, without performing a vertical avoidance maneuver. To do this, it measures the ability of the airplane to avoid the terrain with a sufficient margin without performing a vertical avoidance maneuver, taking into account the location or locations of the penetration or penetrations of the terrain along an alert prober C as well as the capacity of the aircraft to level off knowing the flight conditions.

12 Claims, 4 Drawing Sheets

U.S. PATENT DOCUMENTS

| | | | | |
|---|---|---|---|---|
| 7,511,635 | B2 * | 3/2009 | Borel et al. | 340/945 |
| 7,570,177 | B2 * | 8/2009 | Reynolds et al. | 340/961 |
| 7,668,625 | B2 * | 2/2010 | Bitar et al. | 701/1 |
| 7,668,628 | B1 * | 2/2010 | Carrico | 701/9 |
| 7,714,744 | B1 * | 5/2010 | Wichgers | 340/965 |
| 7,786,900 | B2 * | 8/2010 | Bitar et al. | 340/976 |
| 7,826,971 | B2 * | 11/2010 | Fontaine et al. | 701/301 |
| 2005/0248470 | A1 | 11/2005 | Berthe | |
| 2007/0031007 | A1 | 2/2007 | Bitar | |
| 2007/0150121 | A1 | 6/2007 | Bitar et al. | |
| 2007/0185652 | A1 | 8/2007 | Salmon et al. | |
| 2007/0265776 | A1 * | 11/2007 | Meunier et al. | 701/301 |
| 2007/0276553 | A1 | 11/2007 | Bitar et al. | |

FOREIGN PATENT DOCUMENTS

| | | | |
|---|---|---|---|
| EP | 0802469 | A1 | 10/1997 |
| FR | 2773609 | A | 7/1999 |
| FR | 2773609 | A1 | 7/1999 |
| FR | 2813963 | A1 | 3/2002 |
| FR | 2842594 | A1 | 1/2004 |
| FR | 2848661 | | 6/2004 |
| FR | 2848661 | A1 | 6/2004 |
| FR | 2860292 | A1 | 4/2005 |
| FR | 2864270 | A1 | 6/2005 |
| FR | 2864312 | A1 | 6/2005 |
| FR | 2867851 | A1 | 9/2005 |
| FR | 2868835 | A1 | 10/2005 |

* cited by examiner

AIRBORNE SYSTEM FOR PREVENTING COLLISIONS OF AN AIRCRAFT WITH THE TERRAIN

RELATED APPLICATIONS

The present application is based on, and claims priority from, France Application Ser. No. 05 12957, filed Dec. 20, 2005, the disclosure of which is hereby incorporated by reference herein in its entirety.

FIELD OF THE INVENTION

The invention relates to airborne systems aboard aircraft for the prevention of terrain collisions while the aircraft is still maneuverable. It relates more particularly to terrain anticollision airborne systems of the TAWS type (acronym standing for "Terrain Awareness and Warning System").

BACKGROUND OF THE INVENTION

The collisions with the terrain by an aircraft that is still maneuverable termed CFIT (acronym standing for "Controlled Flight Into Terrain") have been and remain one of the main causes of air disasters. To forestall them various types of airborne systems have been proposed.

The GPWS type systems (acronym standing for "Ground Proximity Warning System"), which were developed some thirty years ago, are based on the use of radioprobes making it possible to determine in an instantaneous manner a position or a dangerous tendency to approach the ground on the part of the carrier aircraft.

More recently the GPWS type systems have been replaced with more competitive systems of GCAS type (acronym standing for "Ground Collision Avoidance System") also known under the generic term TAWS which rely on the detection of the possibilities of collision between the potential trajectories of the aircraft and the terrain overflown. These TAWS systems, which meet the international aeronautical standard TSO C151A, possess, in addition to the customary functions of the GPWS systems, a predictive function of alert of risk of collision with the relief and/or obstacles on the ground termed "FLTA" (acronym standing for "Forward Looking Terrain collision Awareness and alerting") which delivers alerts and alarms to the crew so that an avoidance maneuver is engaged when a situation of risk of collision with the terrain arises.

The FLTA function relies on a location fix of the aircraft with respect to the region overflown provided by a flight equipment such as: inertial platform, satellite-based positioning receiver, baro-altimeter, radio-altimeter or a combination between several of these sensors, and on the monitoring of the penetration into one or more deployment protection volumes tied to the aircraft, of a model of the relief and/or of the obstacles on the ground which is extracted from a digital map accessible from the aircraft.

As it involves detecting a penetration of the terrain overflown, the protection volumes tied to the aircraft are mainly defined by their lower and frontal surfaces which form probers and whose longitudinal profiles correspond to those of a standard avoidance maneuver trajectory engaged in the more or less short term on the basis of an extrapolation of the trajectory followed by the aircraft.

The very widely advocated avoidance maneuver corresponds to a pure vertical avoidance maneuver termed "Pull-Up", which consists of a full-throttle climb preceded by a flattening out of the wings if the airplane was banking and which is termed the "standard avoidance maneuver" or else "SVRM" (acronym standing for "Standard Vertical Recovery Maneuver").

For further details on the ideas implemented in the TAWS systems, useful reference may be made to American patents U.S. Pat. Nos. 5,488,563, 5,414,631, 5,638,282, 5,677,842, 6,088,654, 6,317,663, 6,480,120 and to French patent applications FR 2.813.963, FR 2.842.594, FR 2.848661, FR 2.860.292, FR 2.864.270, FR 2.864.312, FR 2.867.851, FR 2.868.835.

The protection volumes tied to the aircraft are in general two or more in number, of tiered sizes, the foreward most being used to give an alert ("Caution") signifying to the crew of the aircraft that the trajectory followed will have to be modified in the medium term to avoid the terrain, and the closest being used to give alarms ("Pull-up", "Avoid Terrain") signifying to the crew of the aircraft that it must actually engage, as a matter of great urgency, an avoidance maneuver.

During an approach for landing, the systematic response of a crew without outside visual reference, to an alert ("Caution") of a TAWS system is the interruption of the approach maneuver for the engagement of a standard terrain avoidance maneuver with a view to bringing the aircraft to a safety altitude where a new approach procedure can be initiated in complete safety. This response to the detected risk of collision which involves a renewal of the approach procedure is particularly constraining while perhaps, a simple trajectory stabilization maneuver would have sufficed to deal with the risk. It is also constraining, but to a lesser extent, while gaining a cruising altitude after takeoff.

There therefore exists a requirement to better characterize an alert ("Caution") of a TAWS system to allow a crew to better proportion its maneuver to the detected risk of collision with the terrain.

SUMMARY OF THE INVENTION

The present invention is aimed at meeting this requirement.

The present invention is directed to an airborne system aboard an aircraft, for the prevention of collisions with the terrain comprising:

- a detector of risk of collision of the terrain by likening a risk of collision of the terrain after a predetermined period of forecasting, to the penetration of a cartographic representation of the terrain overflown stored in a database accessible from the aircraft, into a deployment protection volume tied to the aircraft located with respect to the terrain overflown by means of an airborne locating equipment, oriented in the direction of progress of the aircraft, presenting a lower surface profile modeling a potential trajectory comprising, as first part, an extrapolation of the trajectory followed by the aircraft, predicted on the basis of the flight information, delivered by the flight equipments of the aircraft, as second part, a terrain avoidance trajectory engaged over the forecast period, and, between the two parts, a transition trajectory, and
- an alert generator producing alert messages on request of the collision risk detector.

This system for preventing collisions with the terrain is notable in that it furthermore comprises:

- locating means for pinpointing the locations of the penetrations of the cartographic representation of the terrain overflown, on the lower longitudinal profile of the protection volume, at the origin of alert messages emitted by the alert generator, and particularization means for particularizing an alert message emitted by the alert generator as a function of the location or locations, in the deployment protection volume, of the penetration or penetrations of the cartographic representation of the terrain overflown, which are the cause thereof.

Advantageously, the particularization means match up an alert message of "Caution" type with the detection of a risk of collision of the terrain corresponding to one or more penetrations of the cartographic representation of the terrain overflown into the profile of the lower surface of the deployment protection volume, when one at least of the penetrations is situated at the level of the second part of the potential trajectory modeled by the profile of the lower surface of the deployment protection volume.

Advantageously, the particularization means match up an alert message of "Too Low Terrain" type with the detection of a risk of collision of the terrain corresponding to one or more penetrations of the cartographic representation of the terrain overflown into the profile of the lower surface of the deployment protection volume, when none of these penetrations are situated at the level of the second part of the potential trajectory modeled by the profile of the lower surface of the deployment protection volume.

Advantageously, the system furthermore comprises: means of verification of the capacity of the aircraft, when it is descending, to regain, under the flight conditions at the time, a level flight trajectory complying with a safety altitude floor with respect to the terrain overflown.

Advantageously, upon the detection of a risk of ground collision while the aircraft is descending and when the detection results from penetrations of the cartographic representation of the terrain into the profile of the lower surface of the deployment protection volume outside of the second part of the modeled trajectory, the particularization means match up an alert message of "Too Low Terrain" type in the event of positive verification of the ability of the aircraft to regain a level flight trajectory complying with a safety floor by the verification and "Caution" type means in the converse case.

Advantageously, the system furthermore comprises means for testing the angle of vertical pivoting, about an origin tied to the aircraft, of the profile of the lower surface of the deployment protection volume, to eliminate a penetration of a cartographic representation of the terrain.

Advantageously, upon the detection of a risk of ground collision while the detection results from penetrations of the cartographic representation of the terrain into the profile of the lower surface of the deployment protection volume outside of the second part of the modeled trajectory, the particularization means match up an alert message of "Too Low Terrain" type accompanied by a directive to increase climb slope dependent on the angle of pivoting value provided by the test means.

BRIEF DESCRIPTION OF THE DRAWINGS

Other characteristics and advantages of the invention will emerge from the description hereafter of an embodiment of the invention given by way of example. This description will be offered in relation to the drawing in which.

a FIG. 1 is a basic diagram of an airborne terrain anticollision equipment aboard an aircraft with a view to securing its piloting, a FIG. 2 is a view, essentially in the vertical plane, showing the shapes of two probers, one of alert and the other of alarm, used to detect risks of collisions with the terrain in a terrain anticollision equipment according to the invention, and some

DETAILED DESCRIPTION OF THE EMBODIMENTS

Figure 1:
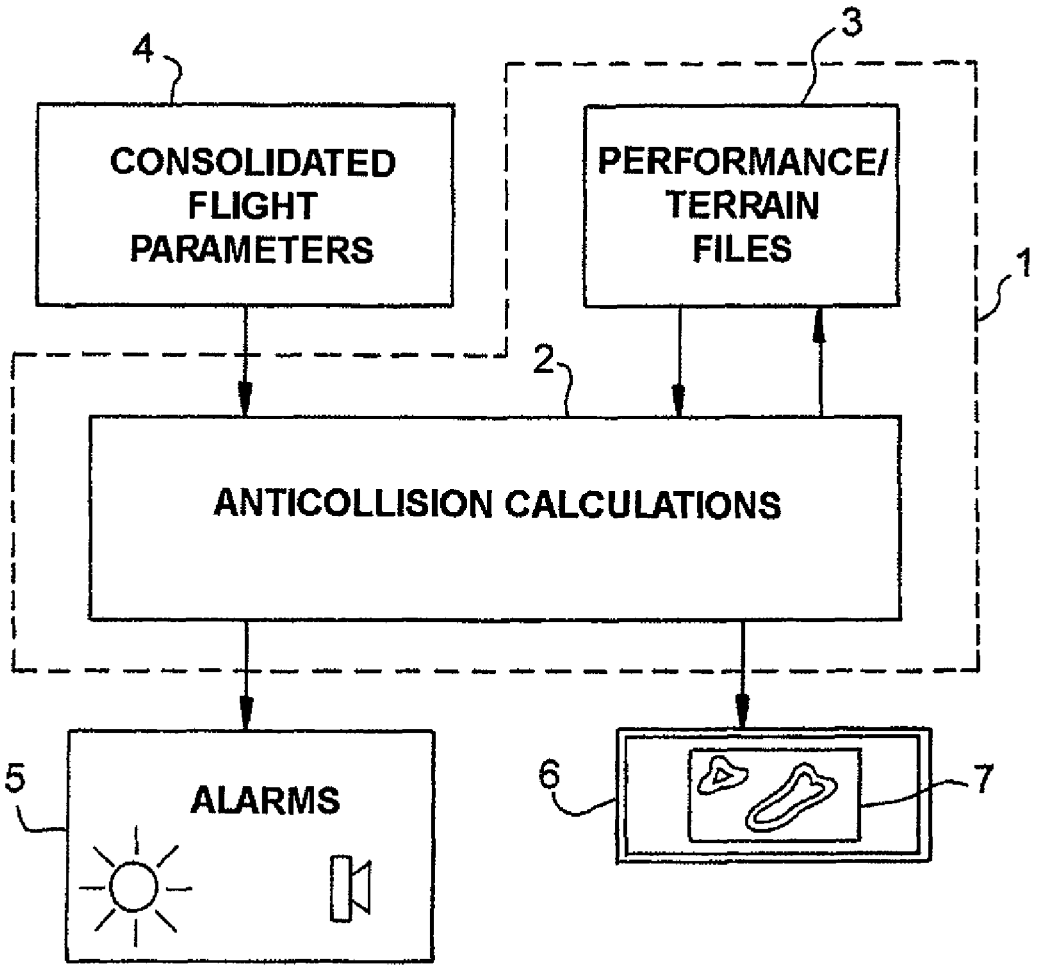

FIG. 1 shows a terrain anticollision equipment 1 in its functional environment aboard an aircraft. The terrain anticollision equipment is composed essentially of a computer 2 associated with cartographic and performance databases characterizing the capacity of the airplane 3 to climb.

The cartographic database stores a set of elevation values corresponding to a sampling of the points of a more or less extensive region of deployment, by a geographical locating grid which can be:

- a regular grid distance-wise, aligned with the meridians and parallels,
- a regular grid distance-wise aligned with the heading of the aircraft,
- a regular grid distance-wise aligned with the course of the aircraft,
- a regular grid angular-wise, aligned with the meridians and parallels,
- a regular grid angular-wise aligned with the heading of the aircraft,
- a regular grid angular-wise aligned with the course of the aircraft.
- a polar representation (radial) centered on the aircraft and its heading,
- a polar representation (radial) centered on the aircraft and its course.

Typically, the grid reproduces a polygonal pattern with four sides, conventionally squares or rectangles, it can also reproduce other polygonal patterns such as triangles or hexagons.

The performance database contains the information necessary for the establishment of the aircraft performance at the time.

The computer 2 can be a computer specific to the terrain anticollision equipment or a computer shared with other tasks like flight management or the automatic pilot. As regards terrain anticollision, it receives from the navigation equipments 4 of the aircraft the main flight parameters, including the position of the aircraft in latitude, longitude and altitude and the direction and the modulus of its speed vector. On the basis of these flight parameters, it performs the following operations:

- delimitation in the deployment region relevant to the cartographic database 3, of an overflight zone within range of the aircraft over a period greater than the alert period sought,
- formulation, on the basis of elevation values of the points of this overflight zone stored in the cartographic database, of a representation of the relief and/or of the obstacles of this overflight zone or rather of an MTCD surface (acronym standing for "Minimum Terrain Clearance Distance") covering the relief and/or the obstacles of the overflight zone and corresponding to a minimum vertical safety margin employed to take account of the inaccuracies of the cartographic database 3,
- determination at each instant, on the basis of the information originating from the flight instruments and the performance database, of at least two deployment protection volumes included one in the other and directed forward of and below the aircraft which must not come into contact with the terrain or the obstacles on the ground that are overflown, comparison of the respective elevations of the points of the deployment protection volumes with those of the representation of the MTCD surface at the level of their samplings by the geographical locating grid used in the cartographic database to detect any intrusion of the MTCD surface into the deployment protection volumes, and at each intrusion detection, emission of a "Caution" alert as soon as the largest of the deployment protection volumes is affected and of a "Pull-up" or "Avoid Terrain" alarm if the smallest deployment protection volume is also affected.

Moreover, to facilitate the evaluation and the resolution of the risks of terrain collision, by the crew of the aircraft, the computer 2 displays on a screen 6 a map of the terrain overflown emphasizing the threatening terrain zones. This two-dimensional map consists of a representation by level curves 7 of the terrain overflown with false colours demarcating the magnitude of the risk of collision corresponding to each terrain slice.

A protection volume tied to the aircraft delimits a part of the space in which the aircraft must be able to deploy in the more or less near future without any risk of collision with the terrain. Its significance and its shape depend on the period sought between the emission of an alert or alarm and the realization of the corresponding risk of collision with the terrain, and of the maneuverability of the aircraft at the instant considered, that is to say of the capacities of deployment of the aircraft which are tied to its performance, to the modulus and to the direction of its air speed, and to its flight trim (flight in a straight line or banking, etc.). It is defined by a virtual envelope without physical reality, of which only the lower and frontal parts are considered since they are the only possible ways of penetrating into the protection volume for the terrain or obstacles on the ground.

They are customarily likened to a band, of horizontal transverse axis, following, with a certain vertical shift, the trajectory which would be followed by the aircraft in the case where its crew were to be warned of a risk of terrain collision and would make it adopt, after a normal reaction time augmented with a longer or shorter safety margin, a climb avoidance trajectory, with a slope in the vicinity of the maximum of its possibilities at the time. This band, of horizontal transverse axis, starts from below the aircraft, at a vertical distance corresponding to a safety margin to be complied with for the aircraft in relation to the ground. It goes on widening to take account of the increasingly large uncertainty as to the forecastable position of the aircraft as the forecast period increases. It begins by steering in the direction of the movement of the aircraft, then curves upwards until it adopts a climb slope corresponding to the maximum of the climb possibilities of the aircraft. In practice, this band of horizontal transverse axis with a longitudinal profile corresponding to that of a potential trajectory comprising as first part an extrapolation of the trajectory followed by the aircraft, predicted on the basis of the flight information, delivered by the flight equipments of the aircraft and of the information of the performance database, as second part a climb avoidance maneuver trajectory with a slope in the vicinity of the maximum of the possibilities at the time, engaged over the forecast period, and, between the two parts, a transition trajectory corresponding to a zeroing of the angle of roll at a speed most typically of 15°/s and to a take-up of an angle of pitch corresponding to a load factor of 0.5 g for example until a climb slope is obtained corresponding to the aircraft's climb possibilities at the time for example 90%.

This band of horizontal transverse axis serves as prober since it is its crossing by the MTCD surface covering the relief and/or the obstacles on the ground which serves as criterion for deciding the penetration of the terrain or of the obstacles on the ground into the protection volume and for admitting the existence of a risk of collision.

Figure 2:
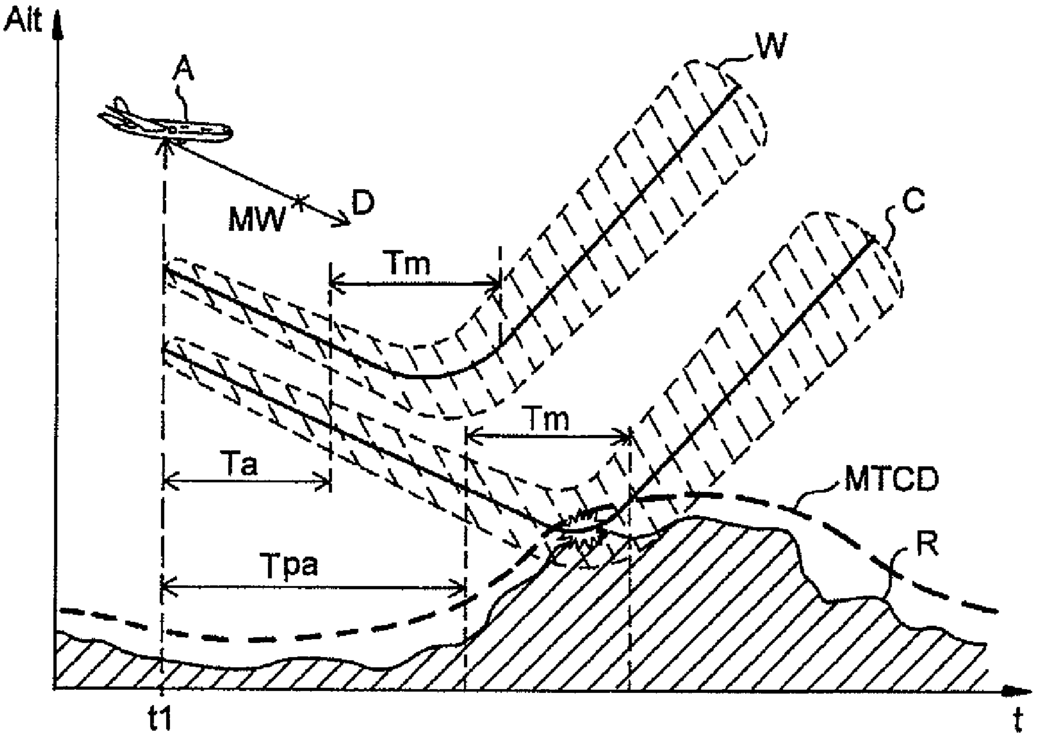

In FIG. 2, an aircraft A is moving, descending, at an instant t1 and in a direction D, above a vertical profile terrain R. This aircraft A is provided with a terrain anticollision equipment which implements two deployment protection volumes included one in the other: a large protection volume which is used for alerts signifying to the crew that the trajectory followed will have to be modified in the short term to avoid the terrain and which corresponds to a first alert prober C, and a small protection volume which is used for alarms signifying to the crew of the aircraft that they must actually engage, as a matter of great urgency, an avoidance maneuver and which corresponds to a second alarm prober W. The two probers C and W used for the alerts and the alarms model avoidances of the relief from the top, commenced at instants t1+Tpa and t1+Ta and requiring an implementation time Tm. The detection of the risks of terrain collision in the short term for an alert involves forecasting the avoidance maneuver from the top after a larger period than the detection of the risks of terrain collision in the very short term for an alarm, this manifesting itself by a shift of the prober C with respect to the prober W along the time axis, towards the future. As it relies on a longer term forecast of the position of the aircraft, it is less reliable. To nevertheless keep its sureness of detection the same, its prober C is also shifted downwards with respect to the prober W.

In the situation represented in FIG. 2, the anticollision equipment of the aircraft A detects at the instant t1, a penetration of the MTCD surface covering the relief R through its alert prober C. It produces accordingly a "Caution" alert to which a crew deprived of outside visual references is normally required to respond via a maneuver to correct its vertical trajectory compelling it to interrupt its descent while a simple levelling off would make it possible to deal with the detected risk of terrain collision and to avoid interrupting an engaged approach.

As the detection of the penetration of the MTCD surface is done by comparison of the elevations of the points of the MTCD surface and of the points of the probers C and W sampled by the geographical locating grid used by the cartographic database, the points of penetration of the MTCD surface into these probers C and W are located de facto via their coordinates in the mesh of the locating grid. This implicit knowledge of the location of the points of penetration of the MTCD surface with respect to the longitudinal profile of the alert prober C is used to evaluate the criticality of the risks of collision with the ground which are related to them and particularize the emitted alerts.

More precisely, it is admitted that the penetration of the MTCD surface into the alert prober C at the level of its front edge, in the second part of its longitudinal profile corresponding to a trajectory with maximum climb slope of a standard terrain vertical avoidance maneuver, denotes a risk of collision with the terrain that is particularly critical and requires the engagement of a terrain avoidance maneuver as soon as it occurs. Specifically, the fact that the announced collision occurs at the heart of a standard vertical avoidance maneuver shows that the surpassing of the obstacle may require a fast and significant pick-up of altitude. The detection of this type of risk is then matched up with a conventional "Caution" alert involving on the part of a crew deprived of outside visual references, the short-term interruption of the current maneuver and the engagement of a terrain avoidance maneuver.

On the other hand, the penetration of the MTCD surface at the level of the floor of the alert prober C, into the first part of its longitudinal profile corresponding to the extrapolation of the trajectory followed by the aircraft and possibly to the flareout before the climb at maximum slope of the trajectory of the standard vertical avoidance maneuver, which indicates a risk of collision with the ground in the very short term, is nevertheless of a lesser criticality since the surpassing of the obstacle can be dealt with, via a moderate increase in the climb slope of the trajectory followed by the aircraft. This can easily be estimated by measuring the angle by which it is necessary to vertically pivot the alert prober C, about its origin tied to the aircraft, to make the MTCD surface exit its lower surface, and communicated to the crew with a risk of collision alert of the "Too Low Terrain" kind.

In the case where the aircraft is descending, it is possible to be satisfied with a simple trajectory stabilization to level flight on condition that the aircraft's capacity to regain, under the flight conditions at the time, a level flight trajectory complying with a floor formed of the MTCD surface is verified. The detection of this type of risk is then matched up with an alert of the "Too Low Terrain" kind involving a levelling off of the aircraft on the part of a crew deprived of outside visual references.

Figure 3:
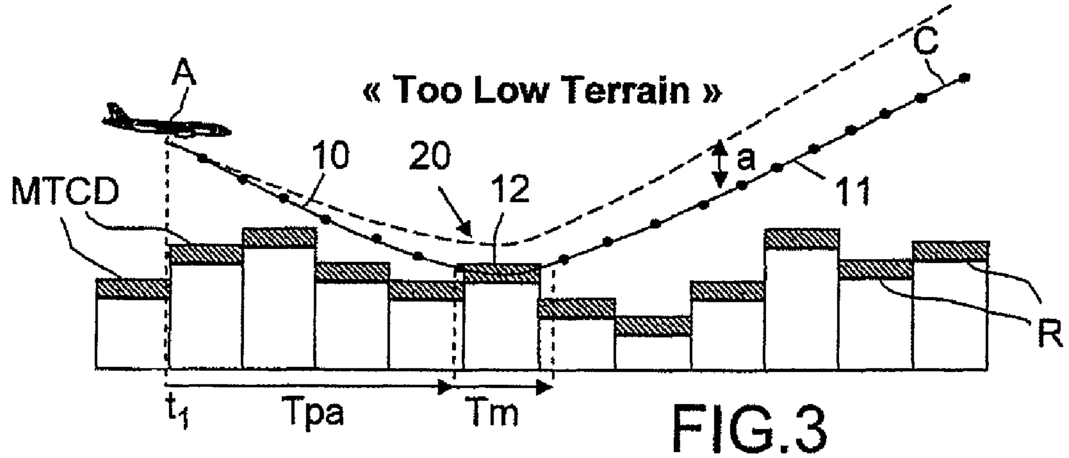
FIGS. 3 to 5 are diagrams illustrating the particularization of the alerts emitted by a terrain anticollision equipment as a function of the situations encountered.
Figure 4:
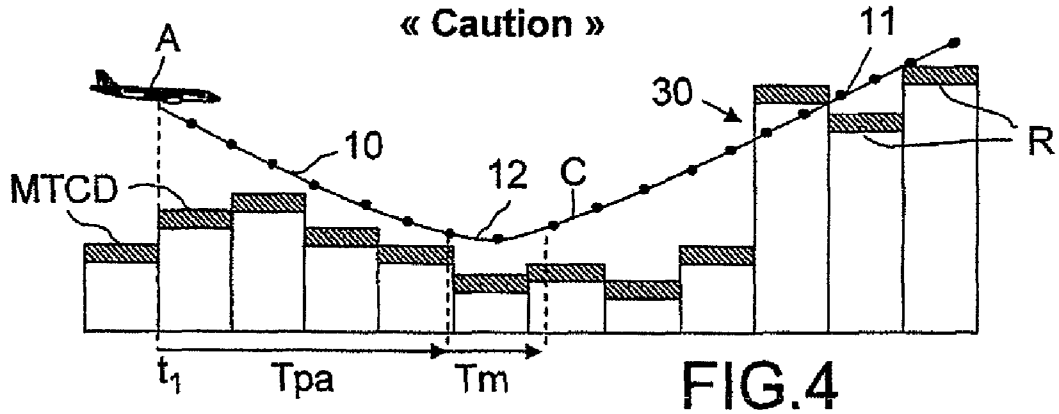
Figure 5:
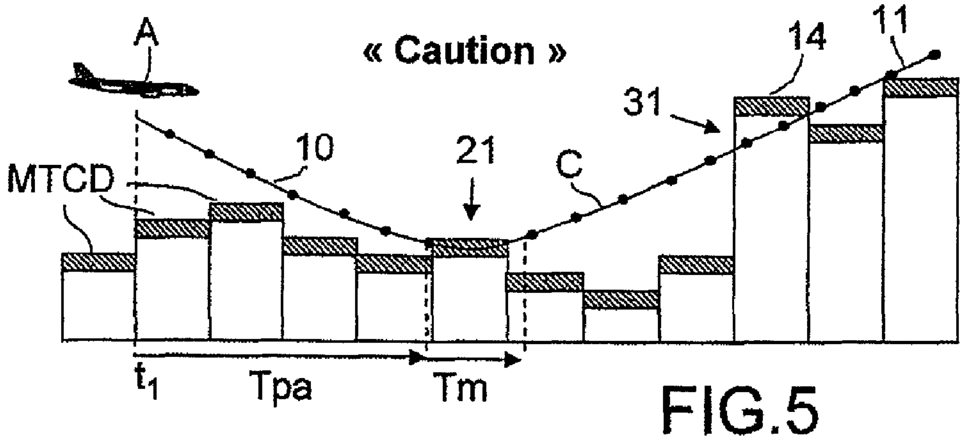

FIGS. 3 to 5 are views in vertical section, of various situations with an aircraft A traversing one and the same course vertical profile with downward slope at the same speed but with respect to different relief profiles R, which all justify the emission of alert of risk of ground collision but which lead to different particularizations of the alerts emitted.

As the aircraft A is imbued with the same motion in the three FIGS. 3 to 5, its TAWS ground anticollision system adopts one and the same longitudinal profile of alert prober C with, as first part 10 over a period Tpa, an extrapolation of the current descent trajectory and, as second part 11 a terrain climb avoidance trajectory with a slope in the vicinity of the maximum and, at the transition, a flareout trajectory 12 for the time Tm required for the changes of the roll and pitch angles.

The relief R and the MTCD surface which covers it, appear in FIGS. 3 to 5 in the form of a succession of terrain elevation values resulting from their samplings by the geographical locating grid used in the cartographic database.

In FIG. 3, the MTCD surface covering the relief R penetrates the alert prober C at a single spot 20 situated at the level of the transition 12 between the current trajectory extrapolation 10 and the climb avoidance trajectory 11 with slope in the vicinity of the maximum. This penetration of the MTCD surface into the alert prober C causes either the measurement of the angle a of vertical pivoting of the alert prober C required to avoid its penetration by the surface MCD and the communication to the crew of this angle value a in the guise of request to increase the climb slope accompanied by a "Too Low Terrain" alert, or, as the aircraft is descending, the verification of the capacity of the aircraft to regain under the flight conditions at the time, a level flight trajectory complying with a floor formed of the MTCD surface and the emission of a "Too Low Terrain" alert in the event of positive verification or of a "Caution" alert in the event of negative verification.

In FIG. 4, the MTCD surface covering the relief R penetrates the alert prober C at a single spot 30 situated at the level of the climb avoidance trajectory 11 with maximum slope. This penetration of the MTCD surface into the alert prober C causes the customary "Caution" alert involving on the part of a crew deprived of outside visual references, the short-term interruption of the current maneuver and the engagement of a terrain avoidance maneuver bringing the aircraft to a safety altitude.

In FIG. 5, the MTCD surface covering the relief R penetrates into the alert prober C at two spots, one 31 situated at the level of the transition 12 between the extrapolation of the current trajectory 10 and the avoidance trajectory 11 and the other 41 situated at the level of the avoidance trajectory 11. The penetration at the level 41 of the avoidance trajectory 11 prevails and causes the customary "Caution" alert calling for a terrain avoidance maneuver.

The location fixes of the penetrations of the terrain along the alert prober C as well as the particularization of the alerts as a function of these location fixes, the testing of the angle of vertical pivoting of the alert prober C required to eliminate a penetration of the terrain and the verification of the capacity of the aircraft to regain, while it is descending, a level trajectory complying with a safety altitude floor with respect to the terrain overflown are carried out by specific means, for example functions programmed into the computer 2 of the terrain anticollision equipment.

The terrain anticollision equipment which has just been described operates with two probers, an alert prober C and an alarm prober W. It is quite obvious that this is not a limitation and that the equipment can use just one or other probers such as a prober of availability of effective vertical avoidance maneuver, a prober for detecting end of avoidance maneuver, etc. Here, it is important only that the terrain anticollision equipment operates with an alert prober.

Figure 6:
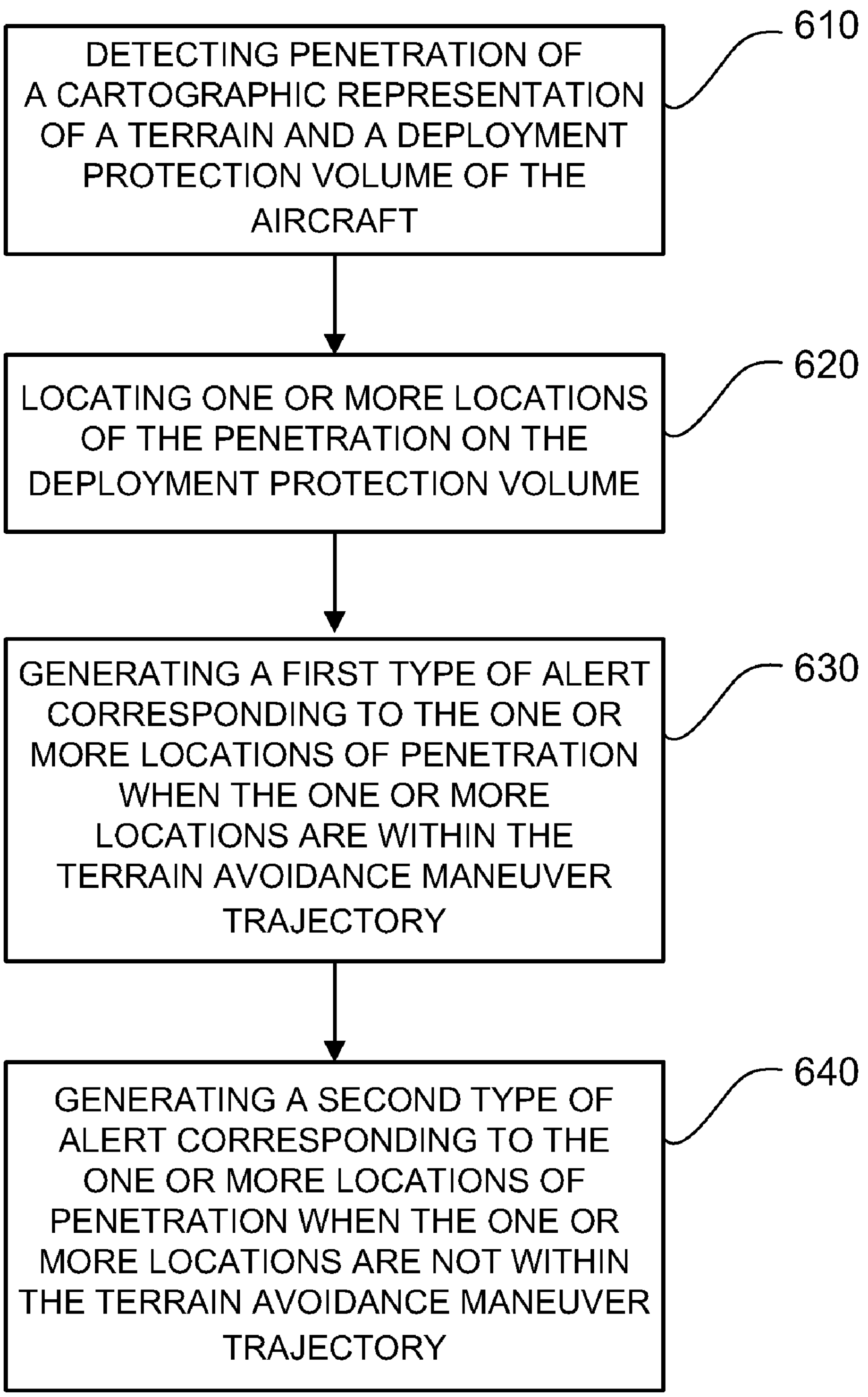
FIG. 6 is a flow chart of a method according to an embodiment of the invention.

FIG. 6 is a flow chart of a method of generating an alarm aboard an aircraft using the anticollision equipment 1 according to an embodiment of the invention. A person of ordinary skill in the art will appreciate that one or more operations may be performed before, during, and/or after the method of FIG. 6.

In operation 610, penetration of a cartographic representation of a terrain and a deployment protection volume of the aircraft is detected by a collision risk detector. The deployment protection volume is tied to a current position of the aircraft and extending in a direction of progress of the aircraft, and the deployment protection volume has a potential trajectory comprising a predicted trajectory, a terrain avoidance maneuver trajectory, and a transition trajectory between the predicted trajectory and the terrain avoidance maneuver trajectory.

In operation 620, one or more locations of the penetration on the deployment protection volume are located by the locating means. In some embodiment, capacity of the aircraft to regain a level flight trajectory complying with a safety altitude floor with respect to the terrain is verified by a means of verification when the aircraft is descending. In yet some other embodiments, an angle of vertical pivoting, about an origin tied to the aircraft, for avoiding the penetration is tested by a means for testing.

Subsequently, in operation 630, a first type of alert corresponding to the one or more locations of penetration is generated by the alarm generator and the particularization means when the one or more locations are within the terrain avoidance maneuver trajectory. Further, in operation 640, a second type of alert corresponding to the one or more locations of penetration is generated by the alarm generator and the particularization means when the one or more locations are not within the terrain avoidance maneuver trajectory.

In some embodiments, the first type of alert is a "Caution" type of alert. In yet some other embodiments, the second type of alert is a "Too Low Terrain" type of alert.

The invention claimed is:

1. A system aboard an aircraft, for preventing collisions with terrain, the system comprising:

a collision risk detector for detecting a risk of collision of the terrain, by likening the risk of collision of the terrain after a predetermined period of forecasting to penetration of a cartographic representation of the terrain overflown stored in a database accessible from the aircraft into a deployment protection volume, the deployment protection volume being tied to the aircraft located with respect to the terrain overflown by means of an airborne locating equipment and oriented in a direction of progress of the aircraft, the deployment protection volume having a lower longitudinal profile modeling a potential trajectory comprising, as first part, an extrapolation of a trajectory followed by the aircraft, predicted on the basis of the flight information delivered by the flight equipments of the aircraft, as second part, a model of a terrain avoidance maneuver trajectory engaged over the forecast period, and a transition trajectory between the first part and the second part;

a locating means for pinpointing one or more locations of the penetration of the cartographic representation of the terrain overflown on the lower longitudinal profile of the protection volume;

an alert generator for producing one or more alert messages corresponding to the one or more locations of the penetration on request of the collision risk detector; and a particularization means for particularizing the alert messages emitted by the alert generator as a function of the one or more locations of the penetration.

2. The system according to claim 1, wherein the particularization means match up an alert message of "Caution" type with the detection of a risk of collision of the terrain corresponding to the one or more locations of the penetration when at least one of the locations of the penetration is situated at the second part of the potential trajectory.

3. The system according to claim 1, wherein the particularization means match up an alert message of "Too Low Terrain" type with the detection of a risk of collision of the terrain corresponding to the one or more locations of the penetration when none of the locations of the penetration is situated at the second part of the potential trajectory.

4. The system according to claim 1, further comprising: a means of verification of the capacity of the aircraft to regain, under the flight conditions at the time, a level flight trajectory complying with a safety altitude floor with respect to the terrain overflown when the aircraft is descending.

5. The system according to claim 4, wherein, upon the detection of a risk of ground collision while the aircraft is descending and when the one or more locations of the penetration are outside of the second part of the potential trajectory, the particularization means match up an alert message of "Too Low Terrain" type in the event of positive verification of the ability of the aircraft to regain a level flight trajectory complying with a safety floor by the verification and "Caution" type means in the converse case.

6. The system according to claim 1, further comprising a means for testing the angle of vertical pivoting, about an origin tied to the aircraft, of the lower longitudinal profile of the protection volume, to eliminate the penetration of a cartographic representation of the terrain corresponding to the one or more locations.

7. System according to claim 6, wherein, upon the detection of a risk of ground collision while the one or more locations of the penetration are outside of the second part of the potential trajectory, the particularization means match up an alert message of "Too Low Terrain" type accompanied by a directive to increase climb slope dependent on the angle of pivoting value provided by the testing means.

8. A method of generating an alarm aboard an aircraft, the method comprising:

detecting penetration of a cartographic representation of terrain and a deployment protection volume of the aircraft, the deployment protection volume being tied to a current position of the aircraft and extending in a direction of progress of the aircraft, and the deployment protection volume having a potential trajectory comprising a predicted trajectory, a terrain avoidance maneuver trajectory, and a transition trajectory between the predicted trajectory and the terrain avoidance maneuver trajectory;

locating one or more locations of the penetration on the deployment protection volume;

generating a first type of alert corresponding to the one or more locations of penetration when the one or more locations are on the terrain avoidance maneuver trajectory; and generating a second type of alert corresponding to the one or more locations of penetration when the one or more locations are not on the terrain avoidance maneuver trajectory.

9. The method of claim 8, wherein the first type of alert is a "Caution" type of alert.

10. The method of claim 8, wherein the second type of alert is a "Too Low Terrain" type of alert.

11. The method of claim 8, further comprising:

verifying capacity of the aircraft to regain a level flight trajectory complying with a safety altitude floor with respect to the terrain when the aircraft is descending.

12. The method of claim 8, further comprising:

testing an angle of vertical pivoting, about an origin tied to the aircraft, for avoiding the penetration.

* * * * *